(12) United States Patent
Hirose et al.

(10) Patent No.: US 11,118,972 B2
(45) Date of Patent: Sep. 14, 2021

(54) OPTICAL DETECTION DEVICE HAVING ADHESIVE MEMBER

(71) Applicant: HAMAMATSU PHOTONICS K.K., Hamamatsu (JP)

(72) Inventors: Masaki Hirose, Hamamatsu (JP);
Katsumi Shibayama, Hamamatsu (JP);
Takashi Kasahara, Hamamatsu (JP);
Toshimitsu Kawai, Hamamatsu (JP);
Takehiko Yashiro, Hamamatsu (JP);
Mitsushi Mineno, Hamamatsu (JP);
Shigeru Suzuki, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 15/569,101

(22) PCT Filed: Apr. 19, 2016

(86) PCT No.: PCT/JP2016/062414
§ 371 (c)(1),
(2) Date: Oct. 25, 2017

(87) PCT Pub. No.: WO2016/175089
PCT Pub. Date: Nov. 3, 2016

(65) Prior Publication Data
US 2018/0113024 A1    Apr. 26, 2018

(30) Foreign Application Priority Data
Apr. 28, 2015  (JP) .............................. JP2015-092360

(51) Int. Cl.
*G01J 3/26*     (2006.01)
*G02B 26/00*    (2006.01)
(Continued)

(52) U.S. Cl.
CPC .............. *G01J 3/26* (2013.01); *G01J 3/0286* (2013.01); *G01J 3/0291* (2013.01); *G01J 5/024* (2013.01);
(Continued)

(58) Field of Classification Search
CPC ........ G01J 3/26; G01J 5/06; G01J 5/10; G01J 5/0225; G01J 5/045; G01J 3/0291;
(Continued)

(56) References Cited

U.S. PATENT DOCUMENTS

| 4,822,998 A | 4/1989 | Yokota et al. |
| 6,043,492 A | 3/2000 | Lee et al. |

(Continued)

FOREIGN PATENT DOCUMENTS

| CN | 1323980 A | 11/2001 |
| CN | 101853827 A | 10/2010 |

(Continued)

OTHER PUBLICATIONS

International Preliminary Report on Patentability dated Nov. 9, 2017 for PCT/JP2016/062414.

*Primary Examiner* — Hwa Andrew Lee
(74) *Attorney, Agent, or Firm* — Faegre Drinker Biddle & Reath LLP

(57) ABSTRACT

A light detection device includes a Fabry-Perot interference filter, a light detector, a spacer that has a placement surface on which a portion outside a light transmission region in a bottom surface of the interference filter is placed, and an adhesive member that adheres the interference filter and the spacer to each other. Elastic modulus of the adhesive member is smaller than elastic modulus of the spacer. At least a part of a lateral surface of the interference filter is located on the placement surface such that a part of the placement surface of the spacer is disposed outside the lateral surface.

(Continued)

The adhesive member is disposed in a corner portion formed by the lateral surface of the interference filter and the part of the placement surface of the spacer and contacts each of the lateral surface and the part of the placement surface.

8 Claims, 7 Drawing Sheets

(51) Int. Cl.
*G02B 5/28* (2006.01)
*G01J 5/04* (2006.01)
*G01J 5/08* (2006.01)
*G01J 5/02* (2006.01)
*G01J 3/02* (2006.01)
*G01J 5/10* (2006.01)
*G01J 5/06* (2006.01)
*G02B 7/00* (2021.01)

(52) U.S. Cl.
CPC .............. *G01J 5/0225* (2013.01); *G01J 5/045* (2013.01); *G01J 5/046* (2013.01); *G01J 5/06* (2013.01); *G01J 5/0862* (2013.01); *G01J 5/10* (2013.01); *G02B 5/284* (2013.01); *G02B 7/008* (2013.01); *G02B 26/001* (2013.01); *G01J 2005/068* (2013.01)

(58) Field of Classification Search
CPC .......... G01J 5/024; G01J 5/0862; G01J 5/046; G01J 3/0286; G01J 2005/068; G02B 5/284; G02B 26/001; G02B 7/008; G02B 26/00; G02B 5/28
See application file for complete search history.

(56) References Cited

U.S. PATENT DOCUMENTS

| | | | |
|---|---|---|---|
| 6,543,288 | B1 | 4/2003 | Blouin et al. |
| 8,462,348 | B2 | 6/2013 | Shinto et al. |
| 2012/0212824 | A1 | 8/2012 | Sakurai |
| 2015/0092274 | A1* | 4/2015 | Matsuno .............. G02B 26/001 359/578 |

FOREIGN PATENT DOCUMENTS

| | | |
|---|---|---|
| CN | 102645742 A | 8/2012 |
| CN | 104516101 A | 4/2015 |
| JP | S63-048424 A | 3/1988 |
| JP | H6-201454 A | 7/1994 |
| JP | H6-249709 A | 9/1994 |
| JP | H7-159234 A | 6/1995 |
| JP | H10-511772 | 11/1998 |
| JP | 2000-298063 A | 10/2000 |
| JP | 2000-329860 A | 11/2000 |
| JP | 2002-286934 A | 10/2002 |
| JP | 2004-161982 A | 6/2004 |
| JP | 2004-343638 A | 12/2004 |
| JP | 2007-043063 A | 2/2007 |
| JP | 2007-142044 A | 6/2007 |
| JP | 2010-238821 A | 10/2010 |
| JP | 2012-173347 A | 9/2012 |
| JP | 2014-035238 A | 2/2014 |
| JP | 2014-115244 A | 6/2014 |
| JP | 2015-011311 A | 1/2015 |
| JP | 2015-025942 A | 2/2015 |
| JP | 2015-052629 A | 3/2015 |
| JP | 2015-68887 A | 4/2015 |
| TW | 204006 | 4/1993 |
| WO | WO 96/021140 A1 | 7/1996 |
| WO | WO 01/22128 A1 | 3/2001 |

* cited by examiner

OPTICAL DETECTION DEVICE HAVING ADHESIVE MEMBER

TECHNICAL FIELD

The present invention relates to a light detection device including a Fabry-Perot interference filter that has a first mirror and a second mirror with variable distance therebetween.

BACKGROUND ART

An optical module including an interference filter that has a first reflection film and a second reflection film with variable distance therebetween, a substrate that supports the interference filter, and an adhesive layer that is interposed between the interference filter and the substrate is described in Patent Literature 1. In the optical module described in Patent Literature 1, a gel-like resin is used in the adhesive layer to alleviate stress generated in the interference filter due to a difference of thermal expansion coefficients between the interference filter and the substrate.

CITATION LIST

Patent Literature

Patent Literature 1: Japanese Unexamined Patent Publication No. 2012-173347

SUMMARY OF INVENTION

Technical Problem

However, when the Fabry-Perot interference filter that has the first mirror and the second mirror with the variable distance therebetween and a support member are fixed, it is necessary to control a distance between the first mirror and the second mirror with high precision. For this reason, if the adhesive layer made of the gel-like resin between is merely interposed between the Fabry-Perot interference filter and the support member, a variation in the stress generated in the Fabry-Perot interference filter due to a change in use environment temperatures cannot be sufficiently suppressed. As a result, a temperature characteristic of a transmission wavelength in the Fabry-Perot interference filter (a temperature characteristic for a wavelength of light transmitted by the Fabry-Perot interference filter) may not be sufficiently improved. If the adhesive layer made of the gel-like resin is used to fix the Fabry-Perot interference filter and the support member, a holding state of the Fabry-Perot interference filter on the support member may become unstable.

Accordingly, an object of the present invention is to provide a light detection device capable of sufficiently improving a temperature characteristic of a transmission wavelength in a Fabry-Perot interference filter and stabilizing a holding state of the Fabry-Perot interference filter on a support member.

Solution to Problem

A light detection device of an aspect of the present invention includes: a Fabry-Perot interference filter that has a first mirror and a second mirror with variable distance therebetween and is provided with a light transmission region to transmit light according to a distance between the first mirror and the second mirror; a light detector that detects the light transmitted through the light transmission region; a support member that has a placement surface on which a portion outside the light transmission region in a bottom surface of the Fabry-Perot interference filter is placed; and an adhesive member that adheres the Fabry-Perot interference filter and the support member to each other, wherein elastic modulus of the adhesive member is smaller than elastic modulus of the support member, at least a part of a lateral surface of the Fabry-Perot interference filter is located on the placement surface such that a part of the placement surface is disposed outside the lateral surface, and the adhesive member is disposed in a corner portion formed by the lateral surface and the part of the placement surface and contacts each of the lateral surface and the part of the placement surface.

In the light detection device, the adhesive member having the elastic modulus smaller than the elastic modulus of the support member is disposed in the corner portion formed by the lateral surface of the Fabry-Perot interference filter and the part of the placement surface of the support member and contacts each of the lateral surface of the Fabry-Perot interference filter and the part of the placement surface of the support member. As a result, stress generated in the Fabry-Perot interference filter due to a difference of thermal expansion coefficients between the Fabry-Perot interference filter and the support member can be sufficiently absorbed into the adhesive member, as compared with the case in which the adhesive member is merely interposed between the bottom surface of the Fabry-Perot interference filter and the placement surface of the support member, for example. In addition, the Fabry-Perot interference filter can be held on the support member more firmly in a stable state, as compared with the case in which the adhesive member is merely interposed between the bottom surface of the Fabry-Perot interference filter and the placement surface of the support member, for example. Therefore, according to the light detection device, a temperature characteristic of a transmission wavelength in the Fabry-Perot interference filter can be sufficiently improved and a holding state of the Fabry-Perot interference filter on the support member can be stabilized.

In the light detection device of an aspect of the present invention, the adhesive member may include a first portion disposed in the corner portion and a second portion disposed between the placement surface and the bottom surface, and a value obtained by subtracting a thickness of the second portion in a direction vertical to the placement surface from a height of the first portion in the direction vertical to the placement surface may be larger than the thickness of the second portion. As a result, the stress generated in the Fabry-Perot interference filter due to the difference of the thermal expansion coefficients between the Fabry-Perot interference filter and the support member can be sufficiently absorbed into the adhesive member.

In the light detection device of an aspect of the present invention, the Fabry-Perot interference filter may further have a substrate supporting the first mirror and the second mirror, and the adhesive member disposed in the corner portion may contact the substrate in the lateral surface. As a result, the stress generated in the Fabry-Perot interference filter due to the difference of the thermal expansion coefficients between the Fabry-Perot interference filter and the support member can be sufficiently absorbed into the adhesive member. In addition, because the substrate supporting the first mirror and the second mirror is externally held by the adhesive member, the holding state of the Fabry-Perot interference filter can be further stabilized.

In the light detection device of an aspect of the present invention, the lateral surface may include a first lateral surface, and the adhesive member may be disposed in the corner portion formed by the first lateral surface to be continuous over the entire corner portion formed by the first lateral surface and may contact the first lateral surface. As a result, the stress generated in the Fabry-Perot interference filter due to the difference of the thermal expansion coefficients between the Fabry-Perot interference filter and the support member can be uniformly absorbed into the adhesive member, as compared with the case in which a plurality of adhesive members are intermittently disposed in the corner portion formed by the first lateral surface, for example.

In the light detection device of an aspect of the present invention, the lateral surface may include a second lateral surface and a third lateral surface facing each other with the light transmission region therebetween, and the adhesive member may be disposed in each of the corner portion formed by the second lateral surface and the corner portion formed by the third lateral surface and may contact each of the second lateral surface and the third lateral surface. As a result, the Fabry-Perot interference filter can be held on the support member in a more stable state.

In the light detection device of an aspect of the present invention, the lateral surface may include a fourth lateral surface and a fifth lateral surface forming an angular portion, and the adhesive member may be disposed in each of the corner portion formed by the fourth lateral surface and the corner portion formed by the fifth lateral surface and may contact each of the fourth lateral surface and the fifth lateral surface. As a result, in the angular portion on which the stress generated in the Fabry-Perot interference filter due to the difference of the thermal expansion coefficients between the Fabry-Perot interference filter and the support member easily concentrates, the stress can be sufficiently absorbed into the adhesive member.

In the light detection device of an aspect of the present invention, the adhesive member disposed in the corner portion formed by the fourth lateral surface and the adhesive member disposed in the corner portion formed by the fifth lateral surface may be continuous with each other. As a result, in the angular portion on which the stress generated in the Fabry-Perot interference filter due to the difference of the thermal expansion coefficients between the Fabry-Perot interference filter and the support member easily concentrates, the stress can be sufficiently absorbed into the adhesive member.

Advantageous Effects of Invention

According to the present invention, a light detection device capable of sufficiently improving a temperature characteristic of a transmission wavelength in a Fabry-Perot interference filter and stabilizing a holding state of the Fabry-Perot interference filter on a support member can be provided.

DESCRIPTION OF EMBODIMENTS

Figure 1:
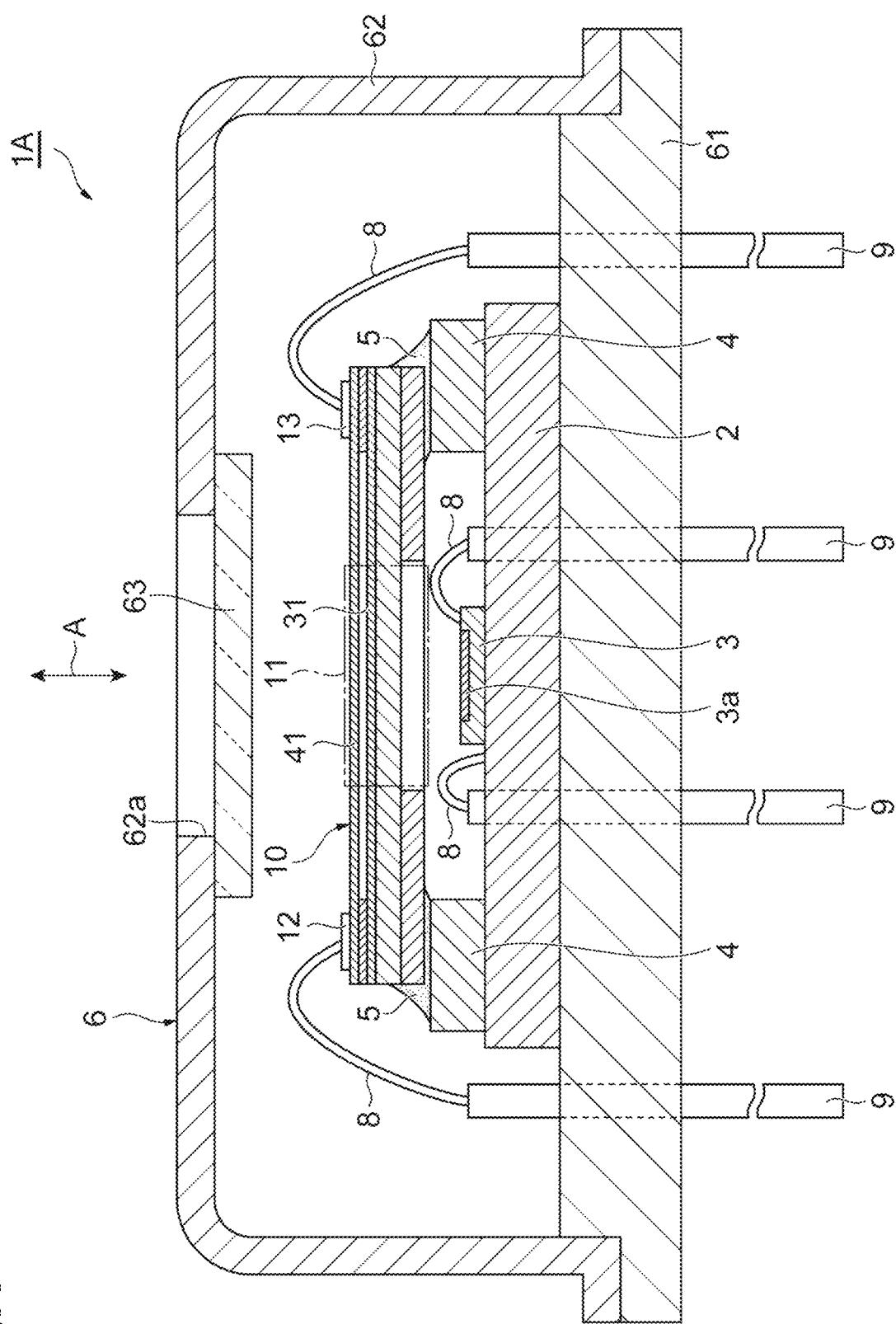
FIG. 1 is a cross-sectional view of a light detection device according to a first embodiment.

Hereinafter, preferred embodiments of the present invention will be described in detail with reference to the drawings. In the individual drawings, the same or equivalent portions are denoted with the same reference numerals and overlapped portions are omitted.

First Embodiment

[Configuration of Light Detection Device]

As illustrated in FIG. 1, a light detection device 1A includes a wiring substrate 2, a light detector 3, a plurality of spacers 4, a plurality of adhesive members 5, and a Fabry-Perot interference filter 10. The Fabry-Perot interference filter 10 has a first mirror 31 and a second mirror 41 with variable distance therebetween. The light detection device 1A is a spectroscopic sensor capable of obtaining a spectral spectrum. That is, in the light detection device 1A, if light is externally incident on a light transmission region 11 of the Fabry-Perot interference filter 10, light having a predetermined wavelength is selectively transmitted according to a distance between the first mirror 31 and the second mirror 41 in the light transmission region 11 and the light transmitted through the light transmission region 11 of the Fabry-Perot interference filter 10 is detected by the light detector 3.

The light detector 3 and a temperature compensation element (not illustrated in the drawings) such as a thermistor are mounted on the wiring substrate 2. As examples of a substrate material of the wiring substrate 2, silicon, ceramic, quartz, glass, plastic, or the like, for example can be used. The light detector 3 has a light reception unit 3a that receives the light transmitted through the light transmission region 11 of the Fabry-Perot interference filter 10. The light transmission region 11 and the light reception unit 3a face each other in a direction A in which the light transmits the light transmission region 11. As an example of the light detector 3, an infrared detector can be used. As examples of the infrared detector, a quantum-type sensor using InGaAs and a thermal-type sensor using a thermopile or a bolometer can be used. When light of individual wavelength regions such as an ultraviolet wavelength region, a visible wavelength region, and a near-infrared wavelength region is detected, a silicon photodiode can be used as the light detector 3. In the light detector 3, one light reception unit 3a may be provided or a plurality of light reception units 3a may be provided in an array shape. In addition, the plurality of light detectors 3 may be mounted on the wiring substrate 2.

The plurality of spacers 4 are fixed on the wiring substrate 2 by adhesive members (not illustrated in the drawings). The Fabry-Perot interference filter 10 is fixed on the plurality of spacers 4 by the adhesive members 5. The plurality of spacers 4 function as support members to support the Fabry-Perot interference filter 10 on the wiring substrate 2. The light detector 3 is disposed in a space formed between the wiring substrate 2 and the Fabry-Perot interference filter 10 by the plurality of spacers 4. As examples of a material of each spacer 4, silicon, ceramic, quartz, glass, and plastic or the like, for example can be used. Particularly, to alleviate a difference of thermal expansion coefficients between the Fabry-Perot interference filter 10 and each spacer 4, a material of each spacer 4 is preferably a material of which a thermal expansion coefficient is equal to a thermal expansion coefficient of the material of the Fabry-Perot interference filter 10. In addition, the wiring substrate 2 and the spacers 4 may be integrally formed. In addition, the Fabry-Perot interference filter 10 may be supported by one spacer 4, not the plurality of spacers 4.

As materials of the adhesive members 5 to adhere the Fabry-Perot interference filter 10 and the individual spacers 4 to each other, flexible resin materials (for example, resin materials such as silicone resins, urethane resins, epoxy resins, acrylic resins, and hybrid resins, which may be conductive or non-conductive) can be used. The resin materials are preferably selected from materials of which Young's modulus is less than 1000 MPa and are more preferably selected from materials of which Young's modulus is less than 10 MPa. In addition, the resin materials are preferably selected from materials of which glass transition temperatures are out of use environment temperatures of the light detection device 1A. For example, if an adhesive material including the silicone resin material is used as the material of the adhesive member 5, Young's modulus after curing becomes less than 10 MPa and a glass transition temperature becomes about −50 to −40° C. lower than the use environment temperatures (for example, about 5 to 40° C.).

Here, elastic modulus of the adhesive members 5 to adhere the Fabry-Perot interference filter 10 and the individual spacers 4 to each other is smaller than elastic modulus of the spacers 4. In addition, the elastic modulus of the adhesive members 5 to adhere the Fabry-Perot interference filter 10 and the individual spacers 4 to each other is smaller than elastic modulus of the adhesive members (not illustrated in the drawings) to adhere the wiring substrate 2 and the individual spacers 4 to each other. For example, if an adhesive material including the epoxy resin material is used as the material of the adhesive members to adhere the wiring substrate 2 and the individual spacers 4 to each other, Young's modulus after curing becomes 100 MPa or more. In addition, the Young's modulus of the spacer 4 becomes 100 GPa or more when the spacer is made of silicon, becomes 100 GPa or more when the spacer is made of ceramic, becomes 10 GPa or more (generally, 70 to 80 GPa) when the spacer is made of glass, and becomes 0.1 GPa or more when the spacer is made of plastic. In addition, the elastic modulus is a generic term for the Young's modulus (longitudinal elastic modulus: a relation of tensile/compression stress and distortion), horizontal elastic modulus (a relation of shearing stress and distortion), and volume elastic modulus (a relation of a pressure and volumetric distortion under uniform compression). That is, the Young's modulus is a specific example of the elastic modulus.

The light detection device 1A further includes a CAN package 6. The CAN package 6 accommodates the wiring substrate 2, the light detector 3, the temperature compensation element (not illustrated in the drawings), the plurality of spacers 4, the plurality of adhesive members 5, and the Fabry-Perot interference filter 10. The CAN package 6 has a stem 61 and a cap 62. An opening 62a is provided in the cap 62 and a plate-like light transmission member 63 is fixed on the opening 62a from the inner side. The light transmission region 11 and the opening 62a face each other in the direction A. As a material of the light transmission member 63, a material (for example, glass, silicon, and germanium) corresponding to a measurement wavelength range of the light detection device 1A can be used. In addition, a light reflection prevention layer may be formed on at least one of a surface and a back surface of the light transmission member 63. In addition, a band-pass filter to transmit only light in the measurement wavelength range may be used as the light transmission member 63.

The wiring substrate 2 is fixed on the stem 61. Each of an electrode pad provided in the wiring substrate 2, a terminal of the light detector 3, a terminal of the temperature compensation element, and terminals 12 and 13 of the Fabry-Perot interference filter 10 is electrically connected to each of a plurality of lead pins 9 penetrating the stem 61 by wires 8. As a result, an input/output of an electric signal with respect to each of the light detector 3, the temperature compensation element, and the Fabry-Perot interference filter 10 is enabled. In the light detection device 1A, because the spacers 4 are disposed right below the terminals 12 and 13 of the Fabry-Perot interference filter 10, wire bonding can be surely performed.

In the light detection device 1A configured as described above, if light is incident on the light transmission region 11 of the Fabry-Perot interference filter 10 through the opening 62a and the light transmission member 63 from the outside, light having a predetermined wavelength is selectively transmitted according to the distance between the first mirror 31 and the second mirror 41 in the light transmission region 11. The light transmitted through the first mirror 31 and the second mirror 41 is incident on the light reception unit 3a of the light detector 3 and is detected by the light detector 3. In the light detection device 1A, the light transmitted through the first mirror 31 and the second mirror 41 is detected by the light detector 3 while a voltage applied to the Fabry-Perot interference filter 10 is changed (that is, while the distance between the first mirror 31 and the second mirror 41 is changed), so that a spectral spectrum can be obtained.

[Configuration of Fabry-Perot Interference Filter]

Figure 2:
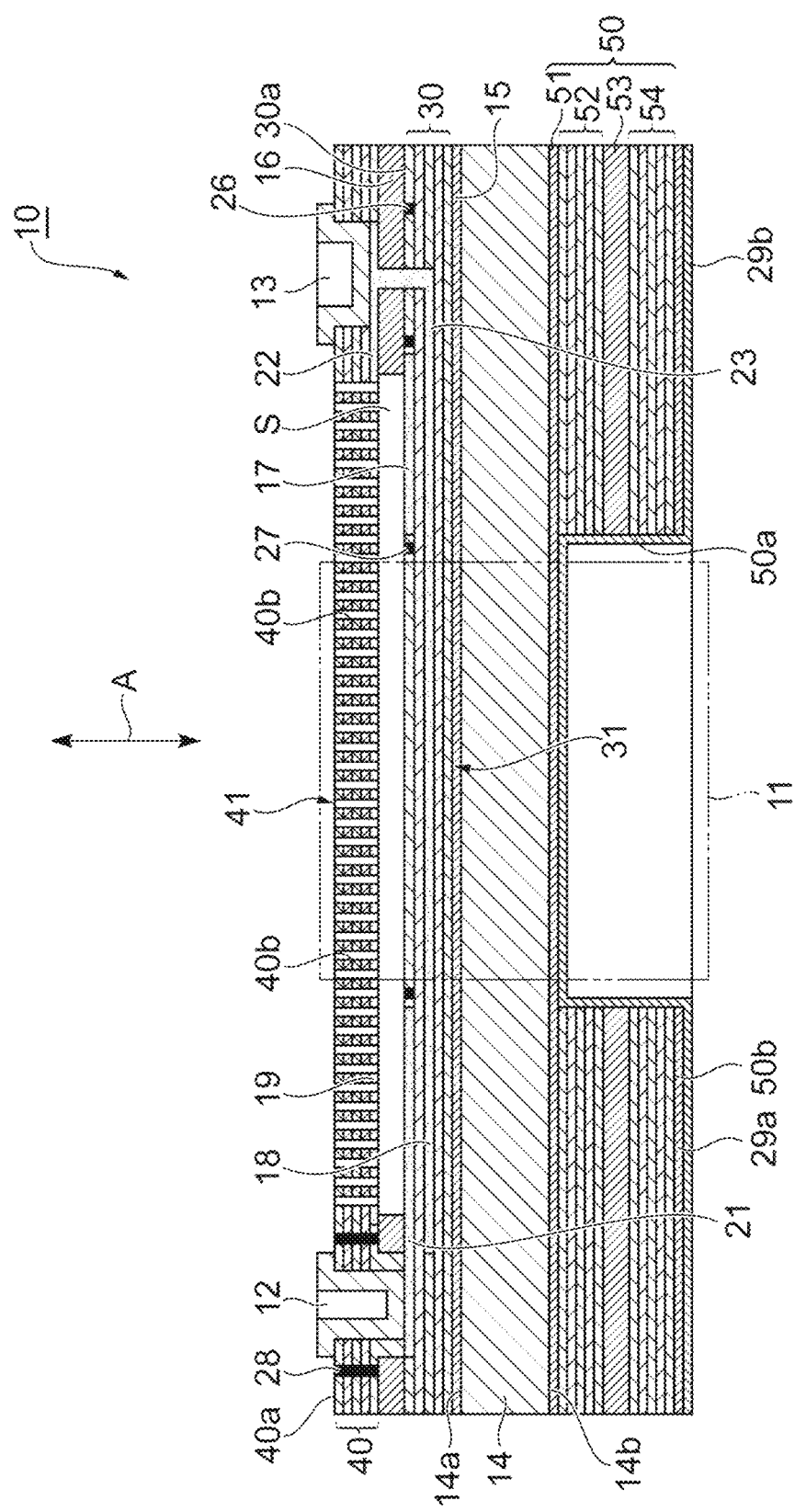
FIG. 2 is a cross-sectional view of a Fabry-Perot interference filter of the light detection device of FIG. 1.

As illustrated in FIG. 2, the Fabry-Perot interference filter 10 includes a substrate 14. A reflection prevention layer 15, a first laminate 30, a sacrificial layer 16, and a second laminate 40 are laminated in this order on a surface 14a of a light incidence side of the substrate 14. An air gap S is formed between the first laminate 30 and the second laminate 40 by the sacrificial layer 16 of a frame shape. In the Fabry-Perot interference filter 10, the light is incident on the second laminate 40 from the side opposite to the substrate 14. In addition, light having a predetermined wavelength transmits the light transmission region 11 defined in a center portion of the Fabry-Perot interference filter 10.

In addition, the substrate 14 is made of silicon, quartz, and glass, or the like, for example. When the substrate 14 is made of the silicon, the reflection prevention layer 15 and the sacrificial layer 16 are made of silicon oxide, for example. A thickness of the sacrificial layer 16 is preferably the integral multiple of ½ of a center transmission wavelength (that is, a center wavelength of a transmission wavelength range of the Fabry-Perot interference filter 10).

A portion corresponding to the light transmission region 11 in the first laminate 30 functions as the first mirror 31. The first laminate 30 is configured by laminating a plurality of polysilicon layers and a plurality of silicon nitride layers alternately. An optical thickness of each of the polysilicon layer and the silicon nitride layer configuring the first mirror 31 is preferably the integral multiple of ¼ of the center transmission wavelength. In addition, instead of the silicon nitride layer, a silicon oxide layer may be used.

A portion corresponding to the light transmission region 11 in the second laminate 40 functions as the second mirror 41 facing the first mirror 31 with the air gap S therebetween. Similar to the first laminate 30, the second laminate 40 is configured by laminating a plurality of polysilicon layers and a plurality of silicon nitride layers alternately. An optical thickness of each of the polysilicon layer and the silicon nitride layer configuring the second mirror 41 is preferably the integral multiple of ¼ of the center transmission wavelength. In addition, instead of the silicon nitride layer, a silicon oxide layer may be used.

A plurality of through-holes 40b extending from a surface 40a of the second laminate 40 to the air gap S are provided to be distributed uniformly in a portion corresponding to the air gap S in the second laminate 40. The plurality of through-holes 40b are formed not to substantially affect a function of the second mirror 41. An inner diameter of each through-hole 40b is 100 nm to 5 µm. In addition, an opening area of the plurality of through-holes 40b occupies 0.01 to 10% of an area of the second mirror 41.

In the Fabry-Perot interference filter 10, the first mirror 31 and the second mirror 41 are supported on the substrate 14. In addition, the first mirror 31 is disposed on a light incidence side of the substrate 14. The second mirror 41 is disposed on a light incidence side of the first mirror 31 with the air gap S therebetween.

In the first mirror 31, a first electrode 17 is formed to surround the light transmission region 11. In addition, in the first mirror 31, a second electrode 18 is formed to include the light transmission region 11. The first electrode 17 and the second electrode 18 are formed by doping impurities into the polysilicon layer and decreasing resistance. A size of the second electrode 18 is preferably a size including an entire region of the light transmission region 11. However, the size of the second electrode 18 may be nearly equal to a size of the light transmission region 11.

In the second mirror 41, a third electrode 19 is formed. The third electrode 19 faces the first electrode 17 and the second electrode 18 with the air gap S therebetween, in the direction A. The third electrode 19 is formed by doping the impurities into the polysilicon layer and decreasing resistance.

In the Fabry-Perot interference filter 10, the second electrode 18 is located at the side opposite to the third electrode 19 with respect to the first electrode 17, in the direction A. That is, the first electrode 17 and the second electrode 18 are not disposed on the same plane in the first mirror 31. The second electrode 18 is farther from the third electrode 19 than the first electrode 17.

The terminals 12 apply a voltage to the Fabry-Perot interference filter 10. The pair of terminals 12 is provided to face each other with the light transmission region 11 therebetween. Each terminal 12 is disposed in the through-hole extending from the surface 40a of the second laminate 40 to the first laminate 30. Each terminal 12 is electrically connected to the first electrode 17 via a wiring line 21.

The terminals 13 apply a voltage to the Fabry-Perot interference filter 10. The pair of terminals 13 is provided to face each other with the light transmission region 11 therebetween. A facing direction of the pair of terminals 12 and a facing direction of the pair of terminals 13 are orthogonal to each other. Each terminal 13 is electrically connected to the third electrode 19 via a wiring line 22. In addition, the third electrode 19 is electrically connected to the second electrode 18 via a wiring line 23.

Trenches 26 and 27 are provided in the surface 30a of the first laminate 30. The trench 26 extends annularly to surround the wiring line 23 extending along the direction A from the terminal 13. The trench 26 electrically insulates the first electrode 17 and the wiring line 23 from each other. The trench 27 extends annularly along an inner edge of the first electrode 17. The trench 27 electrically insulates the first electrode 17 and an inner region of the first electrode 17 from each other. A region in each of the trenches 26 and 27 may be an insulating material and may be an air gap.

A trench 28 is provided in the surface 40a of the second laminate 40. The trench 28 extends annularly to surround the terminal 12. A bottom surface of the trench 28 reaches the sacrificial layer 16. The trench 28 electrically insulates the terminal 12 and the third electrode 19 from each other. A region in the trench 28 may be an insulating material and may be an air gap.

A reflection prevention layer 51, a third laminate 52, an intermediate layer 53, and a fourth laminate 54 are laminated in this order on a surface 14b of a light emission side of the substrate 14. The reflection prevention layer 51 and the intermediate layer 53 have the same configurations as the configurations of the reflection prevention layer 15 and the sacrificial layer 16. The third laminate 52 and the fourth laminate 54 have lamination structures symmetrical to lamination structures of the first laminate 30 and the second laminate 40, on the basis of the substrate 14. A laminate 50 is configured by the reflection prevention layer 51, the third laminate 52, the intermediate layer 53, and the fourth laminate 54. The laminate 50 is disposed on the light emission side of the substrate 14 and has a function of suppressing a warp of the substrate 14.

In the laminate 50, a columnar opening 50a is provided to include the light transmission region 11. The opening 50a is opened to the light emission side and a bottom surface of the opening 50a reaches the reflection prevention layer 51. A light shielding layer 29a is formed on a surface 50b of the light emission side of the laminate 50. The light shielding layer 29a is made of aluminum. A protection layer 29b is formed on a surface of the light shielding layer 29a and an inner surface of the opening 50a. The protection layer 29b is made of aluminum oxide, for example. In addition, a thickness of the protection layer 29b is set to 1 to 100 nm (preferably, about 30 nm), so that an optical influence by the protection layer 29b can be ignored.

In the Fabry-Perot interference filter 10 configured as described above, if a voltage is applied between the first electrode 17 and the third electrode 19 through the terminals 12 and 13, electrostatic force according to the voltage is generated between the first electrode 17 and the third electrode 19. By the electrostatic force, the second mirror 41 is driven to be attracted to the side of the first mirror 31 fixed on the substrate 14. By the drive, the distance between the first mirror 31 and the second mirror 41 is adjusted. The wavelength of the light transmitting the Fabry-Perot interference filter 10 depends on the distance between the first mirror 31 and the second mirror 41 in the light transmission region 11. Therefore, the wavelength of the transmitting light can be appropriately selected by adjusting the voltage applied between the first electrode 17 and the third electrode 19. At this time, because the second electrode 18 has the same potential as the potential of the third electrode 19 electrically connected to the second electrode 18. Therefore, the second electrode 18 functions as a compensation electrode to maintain the first mirror 31 and the second mirror 41 flat in the light transmission region 11.

[Configuration of Adhesive Members to Adhere Fabry-Perot Interference Filter and Spacers]

Figure 3:
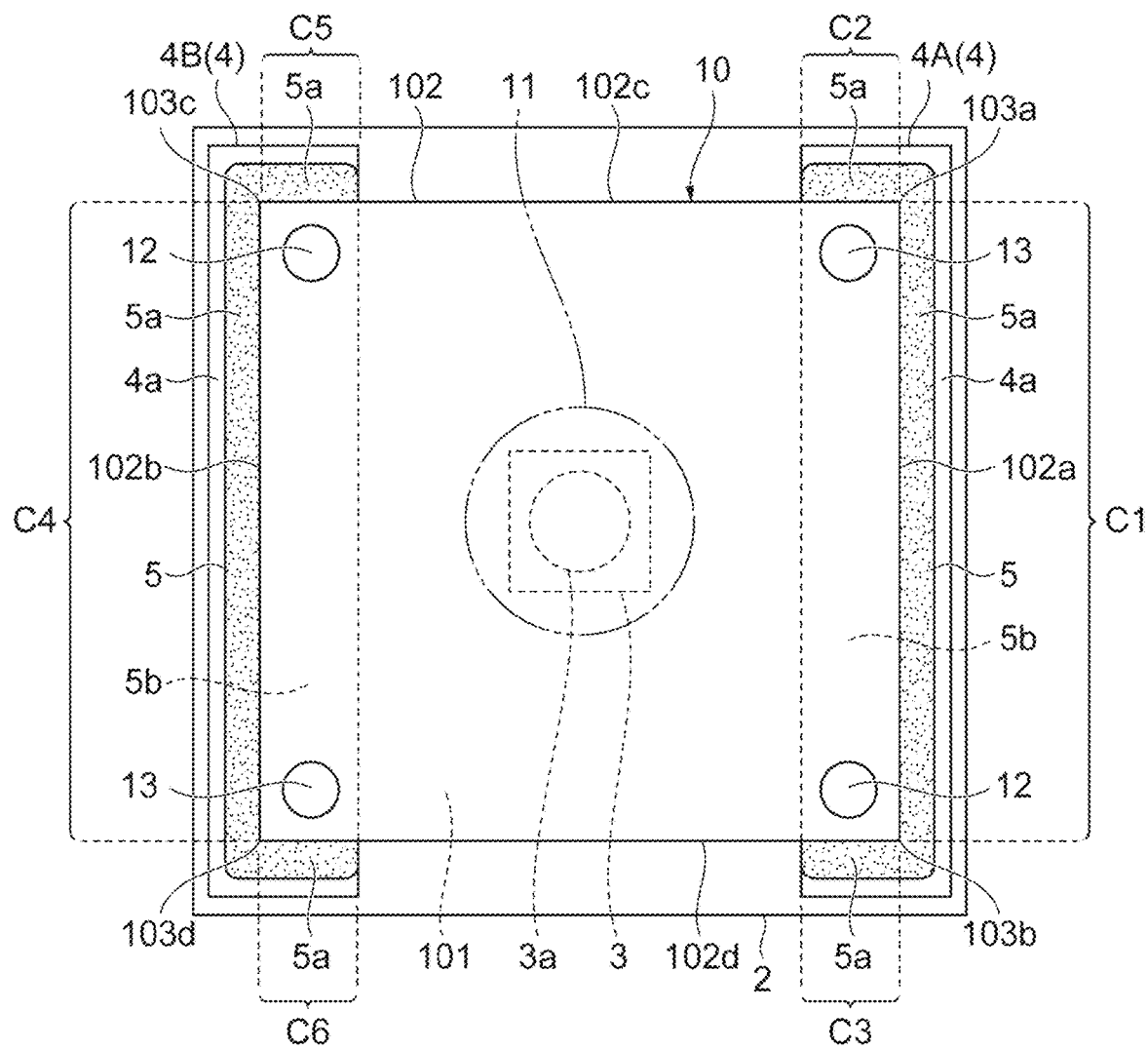
FIG. 3 is a plan view of a portion including the Fabry-Perot interference filter, spacers, and adhesive members in the light detection device of FIG. 1.

A configuration of the adhesive members 5 will be described in detail with reference to FIGS. 3 and 4. In FIG. 3, the wire 8 and the stem 61 are omitted and in FIG. 4, the wiring substrate 2, the wire 8, and the stem 61 are omitted.

As illustrated in FIG. 3, the Fabry-Perot interference filter 10 is supported by the pair of spacers 4A and 4B. In a bottom surface 101 of the Fabry-Perot interference filter 10, a portion outside the light transmission region 11, which is a portion along a lateral surface 102a of the Fabry-Perot interference filter 10, is placed on a placement surface 4a of one spacer 4A. In the bottom surface 101 of the Fabry-Perot interference filter 10, a portion outside the light transmission region 11, which is a portion along a lateral surface 102b of the Fabry-Perot interference filter 10, is placed on a placement surface 4a of the other spacer 4B. The Fabry-Perot interference filter 10 has a rectangular lateral surface 102 when viewed from the direction A. In the lateral surface 102, the lateral surface (first or second lateral surface) 102a and the lateral surface (first or third lateral surface) 102b face each other with the light transmission region 11 therebetween.

The lateral surface 102a is located on the placement surface 4a of the spacer 4A, such that a part of the placement surface 4a of the spacer 4A is disposed outside the lateral surface 102a (outside the lateral surface 102 when viewed from the direction A). As a result, a corner portion C1 (space in an end portion where the lateral surface 102a and a part of the placement surface 4a of the spacer 4A cross each other) is formed by the lateral surface 102a and a portion (exposed portion on which the Fabry-Perot interference filter 10 is not placed) outside the lateral surface 102a in the placement surface 4a of the spacer 4A. One end portion of the side of an angular portion 103a of the lateral surface (fifth lateral surface) 102c forming the angular portion 103a with the lateral surface (fourth lateral surface) 102a in the lateral surface 102 is located on the placement surface 4a of the spacer 4A, such that a part of the placement surface 4a of the spacer 4A is disposed outside the lateral surface 102c. As a result, a corner portion C2 (space in an end portion where the lateral surface 102c and the part of the placement surface 4a of the spacer 4A cross each other) is formed by one end portion of the lateral surface 102c and a portion (exposed portion on which the Fabry-Perot interference filter 10 is not placed) outside one end portion of the lateral surface 102c in the placement surface 4a of the spacer 4A. One end portion of the side of an angular portion 103b of the lateral surface (fifth lateral surface) 102d forming the angular portion 103b with the lateral surface (fourth lateral surface) 102a in the lateral surface 102 is located on the placement surface 4a of the spacer 4A, such that a part of the placement surface 4a of the spacer 4A is disposed outside the lateral surface 102d. As a result, a corner portion C3 (space in an end portion where the lateral surface 102d and the part of the placement surface 4a of the spacer 4A cross each other) is formed by one end portion of the lateral surface 102d and a portion (exposed portion on which the Fabry-Perot interference filter 10 is not placed) outside one end portion of the lateral surface 102d in the placement surface 4a of the spacer 4A. In addition, the lateral surface 102a, one end portion of the lateral surface 102c, and one end portion of the lateral surface 102d correspond to a part of an outer edge of the Fabry-Perot interference filter 10, when viewed from the direction A.

The lateral surface 102b is located on the placement surface 4a of the spacer 4B, such that a part of the placement surface 4a of the spacer 4B is disposed outside the lateral surface 102b. As a result, a corner portion C4 (space in an end portion where the lateral surface 102b and the part of the placement surface 4a of the spacer 4B cross each other) is formed by the lateral surface 102b and a portion (exposed portion on which the Fabry-Perot interference filter 10 is not placed) outside the lateral surface 102b in the placement surface 4a of the spacer 4B. The other end portion of the side of an angular portion 103c of the lateral surface (fifth lateral surface) 102c forming the angular portion 103c with the lateral surface (fourth lateral surface) 102b in the lateral surface 102 is located on the placement surface 4a of the spacer 4B, such that the part of the placement surface 4a of the spacer 4B is disposed outside the lateral surface 102c. As a result, a corner portion C5 (space in an end portion where the lateral surface 102c and the part of the placement surface 4a of the spacer 4B cross each other) is formed by the other end portion of the lateral surface 102c and a portion (exposed portion on which the Fabry-Perot interference filter 10 is not placed) outside the other end portion of the lateral surface 102c in the placement surface 4a of the spacer 4B. The other end portion of the side of an angular portion 103d of the lateral surface (fifth lateral surface) 102d forming the angular portion 103d with the lateral surface (fourth lateral surface) 102b in the lateral surface 102 is located on the placement surface 4a of the spacer 4B, such that the part of the placement surface 4a of the spacer 4B is disposed outside the lateral surface 102d. As a result, a corner portion C6 (space in an end portion where the lateral surface 102d and the part of the placement surface 4a of the spacer 4B cross each other) is formed by the other end portion of the lateral surface 102d and a portion (exposed portion on which the Fabry-Perot interference filter 10 is not placed) outside the other end portion of the lateral surface 102d in the placement surface 4a of the spacer 4B. In addition, the lateral surface 102b, the other end portion of the lateral surface 102c, and the other end portion of the lateral surface 102d correspond to a part of the outer edge of the Fabry-Perot interference filter 10, when viewed from the direction A.

In the placement surface 4a of the spacer 4A, the adhesive members 5 are disposed in the individual corner portions C1, C2, and C3 and the adhesive members 5 disposed in the individual corner portions C1, C2, and C3 are continuous with each other. That is, the adhesive members 5 disposed on the placement surface 4a of the spacer 4A are continuous over the entire corner portion C1 and cover the individual angular portions 103a and 103b from the outside.

In the placement surface 4a of the spacer 4B, the adhesive members 5 are disposed in the individual corner portions C4, C5, and C6 and the adhesive members 5 disposed in the individual corner portions C4, C5, and C6 are continuous with each other. That is, the adhesive members 5 disposed on the placement surface 4a of the spacer 4B are continuous over the entire corner portion C4 and cover the individual angular portions 103c and 103d from the outside.

Figure 4:
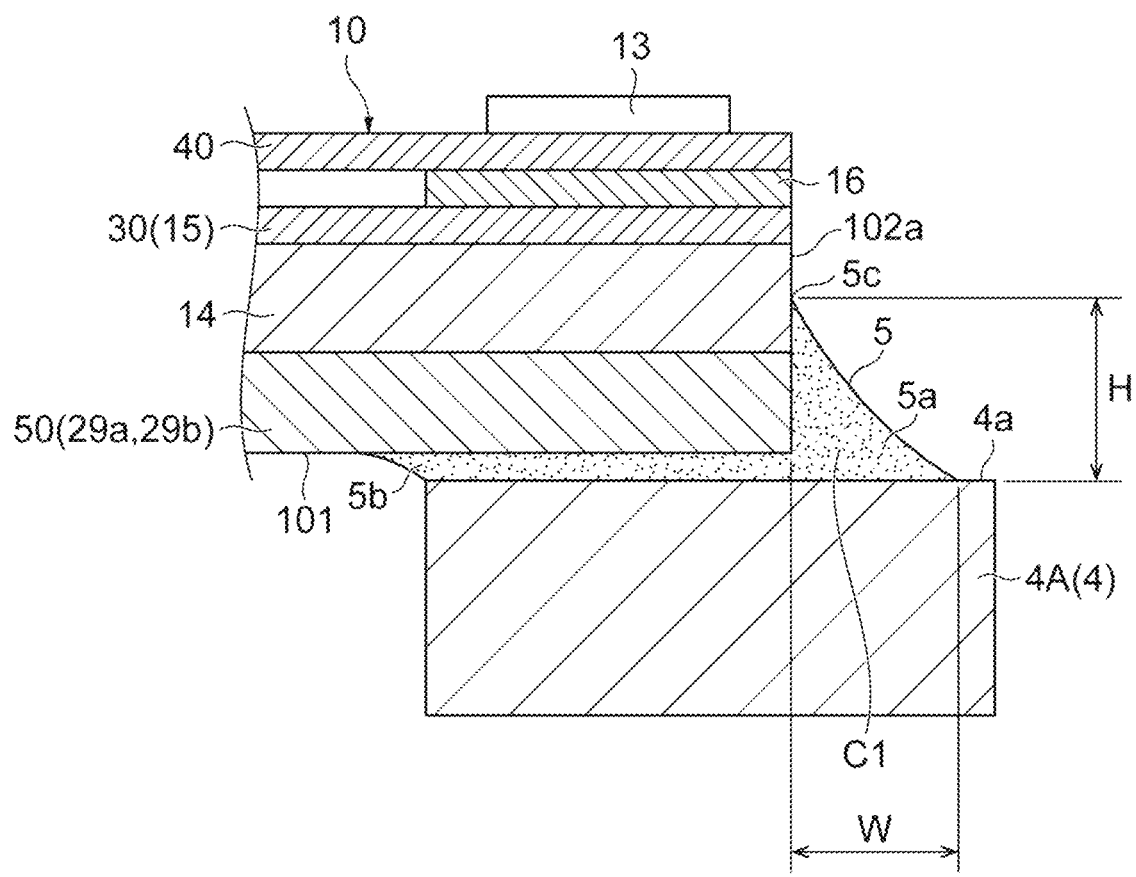
FIG. 4 is a cross-sectional view of the portion including the Fabry-Perot interference filter, the spacers, and the adhesive members in the light detection device of FIG. 1.

As illustrated in FIG. 4, the adhesive member 5 disposed on the placement surface 4a of the spacer 4A includes a first portion 5a and a second portion 5b. The first portion 5a is a portion disposed along the individual corner portions C1, C2, and C3 and is continuous through the individual angular portions 103a and 103b. The second portion 5b is a portion disposed between the placement surface 4a of the spacer 4A and the bottom surface 101 of the Fabry-Perot interference filter 10. In the corner portion C1, the first portion 5a contacts each of the lateral surface 102a and the placement surface 4a of the spacer 4A. In the corner portion C2, the first portion 5a contacts each of one end portion of the lateral surface 102c and the placement surface 4a of the spacer 4A. In the corner portion C3, the first portion 5a contacts each of one end portion of the lateral surface 102d and the placement surface 4a of the spacer 4A. That is, the adhesive member 5 disposed on the placement surface 4a of the spacer 4A contacts each of the lateral surface 102 and the placement surface 4a of the spacer 4A.

Likewise, the adhesive member 5 disposed on the placement surface 4a of the spacer 4B includes a first portion 5a and a second portion 5b. The first portion 5a is a portion disposed along the individual corner portions C4, C5, and C6 and is continuous through the individual angular portions 103c and 103d. The second portion 5b is a portion disposed between the placement surface 4a of the spacer 4B and the bottom surface 101 of the Fabry-Perot interference filter 10. In the corner portion C4, the first portion 5a contacts each of the lateral surface 102b and the placement surface 4a of the spacer 4B. In the corner portion C5, the first portion 5a contacts each of the other end portion of the lateral surface 102c and the placement surface 4a of the spacer 4B. In the corner portion C6, the first portion 5a contacts each of the other end portion of the lateral surface 102d and the placement surface 4a of the spacer 4B. That is, the adhesive member 5 disposed on the placement surface 4a of the spacer 4B contacts each of the lateral surface 102 and the placement surface 4a of the spacer 4B.

In the individual corner portions C1, C2, and C3, a highest edge portion 5c of the first portion 5a reaches the lateral surface of the substrate 14 of the Fabry-Perot interference filter 10. That is, the adhesive member 5 disposed on the placement surface 4a of the spacer 4A contacts the substrate 14 in the lateral surface 102. Likewise, in the individual corner portions C4, C5, and C6, a highest edge portion 5c of the first portion 5a reaches the lateral surface of the substrate 14 of the Fabry-Perot interference filter 10. That is, the adhesive member 5 disposed on the placement surface 4a of the spacer 4B contacts the substrate 14 in the lateral surface 102.

As an example, each of a height H of the first portion 5a in a direction vertical to the placement surface 4a of each of the spacers 4A and 4B and a width W of the first portion 5a in a direction vertical to the lateral surface 102 of the Fabry-Perot interference filter 10 is 10 to 1000 μm. In addition, a thickness of the Fabry-Perot interference filter 10 is 100 to 1000 μm. A width (width in the direction vertical to the lateral surface 102) of a portion of the placement surface 4a that protrudes to the outside of the lateral surface 102 is 10 to 1000 μm. Here, the height H of the first portion 5a is preferably equal to or more than 1/10 of the thickness of the Fabry-Perot interference filter 10 and less than the thickness of the Fabry-Perot interference filter 10. In addition, in the Fabry-Perot interference filter 10, a distance between the bottom surface 101 and the surface 14b of the light emission side of the substrate 14 is 0.1 to 10 μm. For this reason, if the height H of the first portion 5a is set to 10 μm or more, the highest edge portion 5c of the first portion 5a can be caused to reach the lateral surface of the substrate 14 of the Fabry-Perot interference filter 10. In addition, a value (corresponding to the height of the edge portion 5c from the bottom surface 101 of the Fabry-Perot interference filter 10) obtained by subtracting the thickness of the second portion 5b in the direction vertical to the placement surface 4a in the adhesive member 5 from the height H of the first portion 5a in the direction vertical to the placement surface 4a is larger than the thickness of the second portion 5b in the direction vertical to the placement surface 4a.

[Function and Effect]

In the light detection device 1A, the adhesive members 5 having the elastic modulus smaller than the elastic modulus of the individual spacers 4A and 4B are disposed in the corner portions C1, C2, C3, C4, C5, and C6 and contact each of the lateral surface 102 of the Fabry-Perot interference filter and the parts of the placement surfaces 4a of the individual spacers 4A and 4B. As a result, the stress generated in the Fabry-Perot interference filter 10 due to the difference of the thermal expansion coefficients between the Fabry-Perot interference filter 10 and other members (the wiring substrate 2, the stem 61, and the cap 62 as well as the individual spacers 4A and 4B) configuring the light detection device 1A can be sufficiently absorbed into the adhesive members 5, as compared with the case in which the adhesive members 5 are merely interposed between the bottom surface 101 of the Fabry-Perot interference filter 10 and the placement surfaces 4a of the individual spacers 4A and 4B, for example. In addition, the Fabry-Perot interference filter 10 can be held on the spacers 4A and 4B more thinly in a stable state, as compared with the case in which the adhesive members 5 are merely interposed between the bottom surface 101 of the Fabry-Perot interference filter 10 and the placement surfaces 4a of the individual spacers 4A and 4B, for example. Therefore, according to the light detection device 1A, a temperature characteristic of the transmission wavelength in the Fabry-Perot interference filter 10 can be sufficiently improved and a holding state of the Fabry-Perot interference filter 10 on the spacers 4A and 4B can be stabilized. In addition, the adhesive member 5 preferably has the elastic modulus smaller than the elastic modulus of other members (the Fabry-Perot interference filter 10, the wiring substrate 2, the stem 61, and the cap 62 as well as the individual spacers 4A and 4B) configuring the light detection device 1A.

Here, the reason why the temperature characteristic of the transmission wavelength in the Fabry-Perot interference filter 10 is improved when the elastic modulus of the adhesive member 5 decreases and the amount (volume) of the adhesive member 5 increases will be described. First, the second portions 5b are interposed between the placement surfaces 4a of the individual spacers 4A and 4B and the bottom surface 101 of the Fabry-Perot interference filter 10, so that the stress generated in the Fabry-Perot interference filter 10 due to the difference of the thermal expansion coefficients between the Fabry-Perot interference filter 10 and other members configuring the light detection device 1A is absorbed. As a result, the generation of the stress in the Fabry-Perot interference filter 10 is suppressed. Next, when the amount of the first portions 5a disposed in the corner portions C1, C2, C3, C4, C5, and C6 increases, the thermal stress (stress generated from various areas and directions) generated in the CAN package 6 can be sufficiently recovered (absorption amount of the thermal stress by the adhesive member 5>generation amount of the thermal stress in the CAN package 6). Therefore, the temperature characteristic of the transmission wavelength in the Fabry-Perot interference filter 10 is improved.

In addition, because the first portions 5a disposed in the corner portions C1, C2, C3, C4, C5, and C6 are formed in a fillet shape to creep up the lateral surface 102 of the Fabry-Perot interference filter 10, the Fabry-Perot interference filter 10 is held between the placement surfaces 4a of the individual spacers 4A and 4B and the bottom surface 101 of the Fabry-Perot interference filter 10 and from the outside of the lateral surface 102. Therefore, the holding state of the Fabry-Perot interference filter 10 on the spacers 4A and 4B is stabilized. As such, the configuration of the adhesive member 5 in the light detection device 1A can realize both improvement of the temperature characteristic of the transmission wavelength in the Fabry-Perot interference filter 10 and stabilization of the holding state of the Fabry-Perot interference filter 10 on the spacers 4A and 4B.

In addition, the value obtained by subtracting the thickness of the second portion 5b in the direction vertical to the placement surface 4a in the adhesive member 5 from the height H of the first portion 5a in the direction vertical to the placement surface 4a is larger than the thickness of the second portion 5b in the direction vertical to the placement surface 4a. As a result, the stress generated in the Fabry-Perot interference filter 10 due to the difference of the thermal expansion coefficients between the Fabry-Perot interference filter 10 and other members configuring the light detection device 1A can be sufficiently absorbed into the adhesive members 5.

If the width W of the first portion 5a in the direction vertical to the lateral surface 102 of the Fabry-Perot interference filter 10 is larger than the height H of the first portion 5a in the direction vertical to the placement surface 4a of each of the spacers 4A and 4B, both the improvement of the temperature characteristic of the transmission wavelength in the Fabry-Perot interference filter 10 and the stabilization of the holding state of the Fabry-Perot interference filter 10 on the spacers 4A and 4B can be realized more surely. Therefore, the adhesive member 5 preferably contacts the portion of the placement surface 4a protruding to the outside of the lateral surface 102, over the entire width thereof.

In addition, in the light detection device 1A, the adhesive members 5 disposed in the corner portions C1, C2, C3, C4, C5, and C6 contact the substrate 14 in the lateral surface 102 of the Fabry-Perot interference filter 10. As a result, the stress generated in the Fabry-Perot interference filter 10 due to the difference of the thermal expansion coefficients between the Fabry-Perot interference filter 10 and other members configuring the light detection device 1A can be sufficiently absorbed into the adhesive members 5. In addition, because the substrate 14 supporting the first mirror 31 and the second mirror 41 is externally held by the adhesive member 5, the holding state of the Fabry-Perot interference filter 10 can be further stabilized.

In addition, in the light detection device 1A, the adhesive member 5 is disposed in the corner portion C1 to be continuous over the entire corner portion C1 formed by the lateral surface 102a of the Fabry-Perot interference filter 10 and contacts the lateral surface 102a. Likewise, the adhesive member 5 is disposed in the corner portion C4 to be continuous over the entire corner portion C4 formed by the lateral surface 102b of the Fabry-Perot interference filter 10 and contacts the lateral surface 102b. As a result, the stress generated in the Fabry-Perot interference filter 10 due to the difference of the thermal expansion coefficients between the Fabry-Perot interference filter 10 and other members configuring the light detection device 1A can be uniformly absorbed into the adhesive members 5, as compared with the case in which the plurality of adhesive members 5 are intermittently disposed in the individual corner portions C1 and C4 or the case in which the adhesive member 5 is disposed in only one place in the parts of the individual corner portions C1 and C4, for example.

Particularly, if the height H and the width W of the first portion 5a are uniform in the adhesive member 5, the thermal stress generated in the CAN package 6 can be more uniformly absorbed into the adhesive member 5. The adhesive member 5 is formed as follows. That is, an adhesive material including the silicone resin material is applied to the placement surface 4a of each of the spacers 4A and 4B at a uniform thickness, the Fabry-Perot interference filter 10 is placed thereon, and in this state, the adhesive material is thermally cured, for example. When the Fabry-Perot interference filter 10 is placed, the thickness of the adhesive material existing between the placement surface 4a of each of the spacers 4A and 4B and the bottom surface 101 of the Fabry-Perot interference filter 10 becomes uniform by the weight of the Fabry-Perot interference filter 10. In addition, the adhesive material existing in the corner portions C1, C2, C3, C4, C5, and C6 creeps up the lateral surface 102 of the Fabry-Perot interference filter 10 and has the uniform height and width. In this way, the adhesive member 5 including the first portion 5a having the uniform height H and width W is formed.

After the Fabry-Perot interference filter 10 is placed on the placement surface 4a of each of the spacers 4A and 4B and the adhesive material including the silicone resin material is applied along the corner portions C1, C2, C3, C4, C5, and C6 at the uniform thickness, the adhesive material may be thermally cured, for example. Even in this case, when the adhesive material is applied along the corner portions C1, C2, C3, C4, C5, and C6, the adhesive material enters between the placement surface 4a of each of the spacers 4A and 4B and the bottom surface 101 of the Fabry-Perot interference filter 10 and the thickness of the adhesive material becomes uniform by the weight of the Fabry-Perot interference filter 10. In addition, the adhesive material existing in the corner portions C1, C2, C3, C4, C5, and C6 creeps up the lateral surface 102 of the Fabry-Perot interference filter 10 and has the uniform height and width. Alternatively, the adhesive material including the silicone resin material may be applied to only a region of the placement surface 4a of each of the spacers 4A and 4B where the bottom surface 101 of the Fabry-Perot interference filter 10 is placed, the Fabry-Perot interference filter 10 may be placed, the adhesive material may be thermally cured, for example, the adhesive material including the silicone resin material may be applied along the corner portions C1, C2, C3, C4, C5, and C6 at the uniform thickness, and the adhesive material may be thermally cured, for example. Even in this case, when the Fabry-Perot interference filter 10 is placed, the thickness of the adhesive material existing between the placement surface 4a of each of the spacers 4A and 4B and the bottom surface 101 of the Fabry-Perot interference filter 10 becomes uniform by the weight of the Fabry-Perot interference filter 10. In addition, the adhesive material existing in the corner portions C1, C2, C3, C4, C5, and C6 has the uniform height and width in the lateral surface 102 of the Fabry-Perot interference filter 10.

In addition, in the light detection device 1A, the adhesive member 5 is disposed in the corner portion C1 formed by the lateral surface 102a of the Fabry-Perot interference filter 10 and contacts the lateral surface 102a. Furthermore, the adhesive member 5 is disposed in the corner portion C4 formed by the lateral surface 102b of the Fabry-Perot interference filter 10 facing the lateral surface 102a with the light transmission region 11 therebetween and contacts the lateral surface 102b. As a result, the Fabry-Perot interference filter 10 can be held on the spacers 4A and 4B in a more stable state.

Particularly, in the case in which a material (for example, the silicone resin material) having extremely small Young's modulus (Young's modulus of less than 10 MPa) is used as the material of the adhesive member 5, even if the adhesive member 5 is disposed in each of the corner portions C1 and C4 formed by the lateral surfaces 102a and 102b facing each other, respectively, the distortion is suppressed from being generated in the Fabry-Perot interference filter 10 by the thermal stress generated in the CAN package 6 and the thermal stress generated in the CAN package 6 is absorbed by the adhesive member 5.

In addition, in the light detection device 1A, the adhesive members 5 disposed in the individual corner portions C1, C2, and C3 are continuous with each other and cover the individual angular portions 103a and 103b of the Fabry-Perot interference filter 10 from the outside. Likewise, the adhesive members 5 disposed in the individual corner portions C4, C5, and C6 are continuous with each other and cover the individual angular portions 103c and 103d of the Fabry-Perot interference filter 10 from the outside. As a result, in the angular portions 103a, 103b, 103c, and 103d on which the stress generated in the Fabry-Perot interference filter 10 due to the difference of the thermal expansion coefficients between the Fabry-Perot interference filter 10 and other members configuring the light detection device 1A easily concentrates, the stress can be sufficiently absorbed into the adhesive member 5.

In addition, in the light detection device 1A, because the adhesive member 5 is not provided on the entire bottom surface 101 of the Fabry-Perot interference filter 10 (in particular, because the adhesive member 5 is not provided in the light transmission region 11), the following effects are obtained. That is, because the light transmitted through the Fabry-Perot interference filter 10 does not transmit the adhesive member 5, it becomes unnecessary to select the adhesive member 5 having high light transmittance, and a degree of freedom in selecting the adhesive member 5 is improved. In addition, because the light transmitted through the Fabry-Perot interference filter 10 does not transmit the adhesive member 5, the light transmitting the Fabry-Perot interference filter 10 is not affected by the change in the optical characteristics (the refractive index and the transmittance) of the adhesive member 5 due to the change in the ambient temperature. In addition, the Fabry-Perot interference filter 10 is suppressed from being distorted or inclined due to the stress generated by the contraction of the adhesive member 5 at the time of curing and the expansion and contraction of the adhesive member 5 due to the change in the ambient temperature at the time of use.

Second Embodiment

[Configuration of Light Detection Device]

Figure 5:
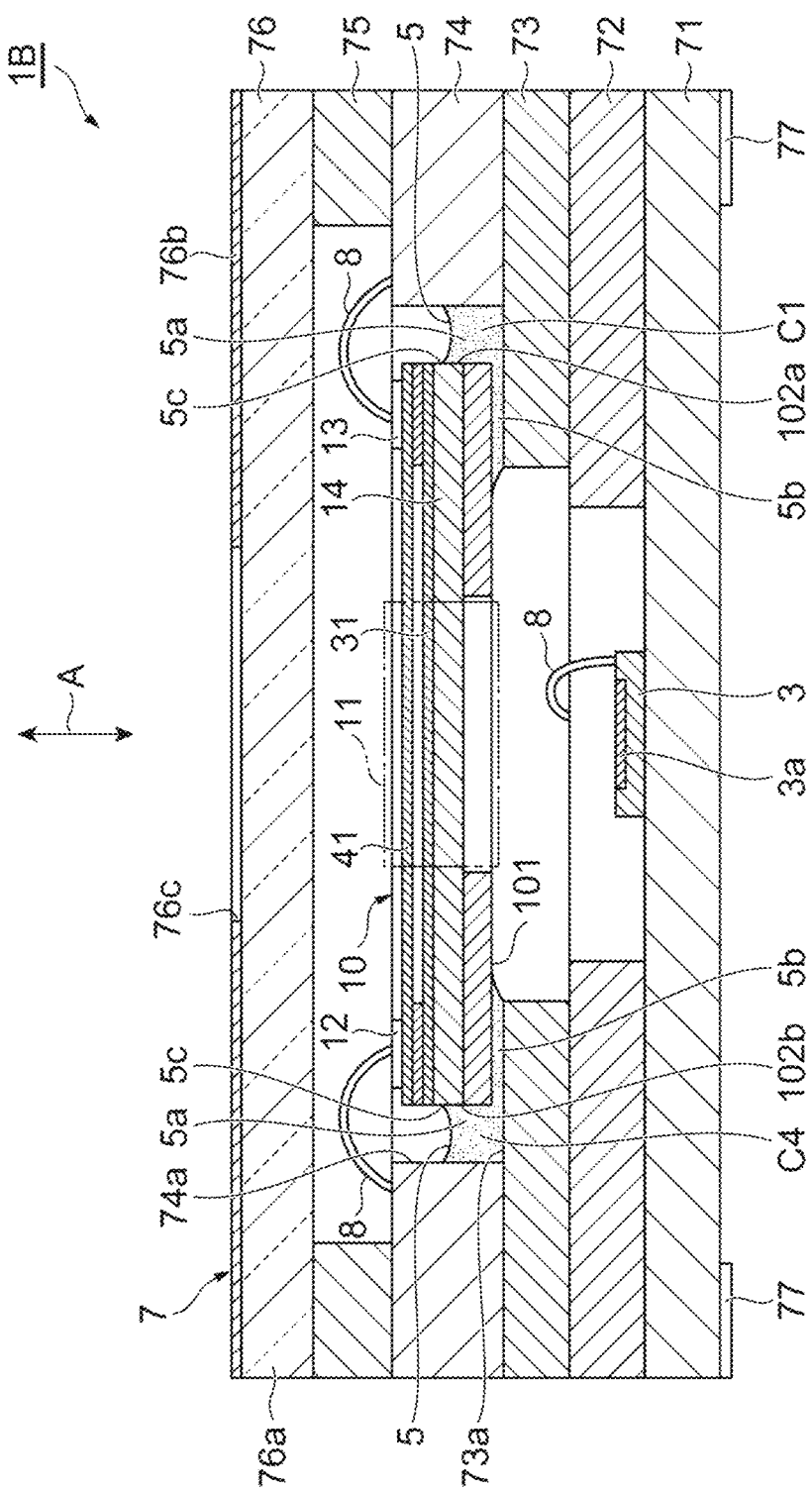
FIG. 5 is a cross-sectional view of a light detection device according to a second embodiment.

As illustrated in FIG. 5, a light detection device 1B is different from the light detection device 1A in that the light detection device 1B is configured as a surface mount device (SMD). The light detection device 1B includes an SMD package 7 that accommodates a light detector 3, a temperature compensation element (not illustrated in the drawings), and a Fabry-Perot interference filter 10. The SMD package 7 has a first layer substrate 71, a second layer substrate 72, a third layer substrate 73, a fourth layer substrate 74, a fifth layer substrate 75, and a sixth layer substrate 76.

The first layer substrate 71, the second layer substrate 72, the third layer substrate 73, the fourth layer substrate 74, the fifth layer substrate 75, and the sixth layer substrate 76 are laminated in this order. An opening is provided in a center portion of each of the second layer substrate 72, the third layer substrate 73, the fourth layer substrate 74, and the fifth layer substrate 75. The opening of the third layer substrate 73 includes the opening of the second layer substrate 72, when viewed from a direction A. The opening of the fourth layer substrate 74 includes the opening of the third layer substrate 73, when viewed from the direction A. The opening of the fifth layer substrate 75 includes the opening of the fourth layer substrate 74, when viewed from the direction A. As a result, a part of a surface of each of the first layer substrate 71, the second layer substrate 72, the third layer substrate 73, and the fourth layer substrate 74 is exposed to the opening of the fifth layer substrate 75.

The light detector 3 and the temperature compensation element (not illustrated in the drawings) are mounted on the exposed surface of the first layer substrate 71. A plurality of electrode pads 77 are provided on a back surface of the first layer substrate 71. Each terminal of the light detector 3 and each terminal of the temperature compensation element are electrically connected to the electrode pads 77 by wiring lines provided in the first layer substrate 71 or wires 8 and wiring lines provided in the individual substrates 71 and 72.

The Fabry-Perot interference filter 10 is fixed on the exposed surface of the third layer substrate 73 by adhesive members 5. Heights of top surfaces of individual terminals 12 and 13 of the Fabry-Perot interference filter 10 are the same as a height of a top surface of the fourth layer substrate 74. Pads electrically connected to the electrode pads 77 are provided on the top surface of the fourth layer substrate 74 and the individual terminals 12 and 13 are connected to the pads on the top surface of the fourth layer substrate 74 by the wires 8. The individual terminals 12 and 13 of the Fabry-Perot interference filter 10 are electrically connected to the electrode pads 77 by the wires 8 and the wiring lines provided in the individual substrates 71, 72, 73, and 74. The third layer substrate 73 functions as a support member to support the Fabry-Perot interference filter 10 on the first layer substrate 71 and the second layer substrate 72.

As examples of materials of the first layer substrate 71, the second layer substrate 72, the third layer substrate 73, the fourth layer substrate 74, and the fifth layer substrate 75, ceramic and a resin can be used. Particularly, a thermal expansion coefficient of the material of the third layer substrate 73 is preferably the same as a thermal expansion coefficient of a material of the Fabry-Perot interference filter 10 to alleviate a difference of the the vial expansion coefficients between the Fabry-Perot interference filter 10 and the third layer substrate 73.

As materials of the adhesive members 5 to adhere the Fabry-Perot interference filter 10 and the third layer substrate 73 to each other, flexible resin materials (for example, resin materials such as silicone resins, urethane resins, epoxy resins, acrylic resins, and hybrid resins, which may be conductive or non-conductive) can be used. The resin materials are preferably selected from materials of which Young's modulus is less than 1000 MPa and are more preferably selected from materials of which Young's modulus is less than 10 MPa. In addition, the resin materials are preferably selected from materials of which glass transition temperatures are out of use environment temperatures of the light detection device 1B. For example, if an adhesive material including the silicone resin material is used as the material of the adhesive member 5, Young's modulus after curing becomes less than 10 MPa and a glass transition temperature becomes about −50 to −40° C. lower than the use environment temperatures (for example, about 5 to 40° C.).

Here, elastic modulus of the adhesive members 5 to adhere the Fabry-Perot interference filter 10 and the third layer substrate 73 to each other is smaller than elastic modulus of the third layer substrate 73. In addition, the elastic modulus of the adhesive members 5 to adhere the Fabry-Perot interference filter 10 and the third layer substrate 73 to each other is smaller than elastic modulus of adhesive members (not illustrated in the drawings) to adhere the first layer substrate 71, the second layer substrate 72, the third layer substrate 73, the fourth layer substrate 74, the fifth layer substrate 75, and the sixth layer substrate 76 to each other. For example, if an adhesive material including the epoxy resin material is used as the material of the adhesive members to adhere the first layer substrate 71, the second layer substrate 72, the third layer substrate 73, the fourth layer substrate 74, the fifth layer substrate 75, and the sixth layer substrate 76 to each other, Young's modulus after curing becomes 100 MPa or more.

The sixth layer substrate 76 has a light transmission substrate 76a and a light shielding layer 76b. The light transmission substrate 76a is fixed on the fifth layer substrate 75 by an adhesive member (not illustrated in the drawings). As a material of the light transmission substrate 76a, a material (for example, glass, silicon, and germanium) corresponding to a measurement wavelength range of the light detection device 1B can be used. The light shielding layer 76b is formed on a surface of the light transmission substrate 76a. As a material of the light shielding layer 76b, a light shielding material or, a light absorption material (for example, a metal such as aluminum, a metal oxide such as a chromium oxide, and a black resin) can be used. The light shielding layer 76b is provided with an opening 76c. A light transmission region 11 and the opening 76c face each other in the direction A. In addition, the light shielding layer 76b may be formed on a back surface of the light transmission substrate 76a. In addition, a light reflection prevention layer may be formed on at least one of the surface and the back surface of the light transmission substrate 76a. In addition, a band-pass filter transmitting only light in the measurement wavelength range may be used as the light transmission substrate 76a.

In the light detection device 1B configured as described above, if light is incident on the light transmission region 11 of the Fabry-Perot interference filter 10 through the opening 76c and the light transmission substrate 76a from the outside, light having a predetermined wavelength is selectively transmitted according to a distance between a first mirror 31 and a second mirror 41 in the light transmission region 11. The light transmitted through the first mirror 31 and the second mirror 41 is incident on a light reception unit 3a of the light detector 3 and is detected by the light detector 3. In the light detection device 1B, the light transmitted through the first mirror 31 and the second mirror 41 is detected by the light detector 3 while a voltage applied to the Fabry-Perot interference filter 10 is changed (that is, the distance between the first mirror 31 and the second mirror 41 is changed), so that a spectral spectrum can be obtained.

[Configuration of Adhesive Members to Adhere Fabry-Perot Interference Filter and Third Layer Substrate]

Figure 6:
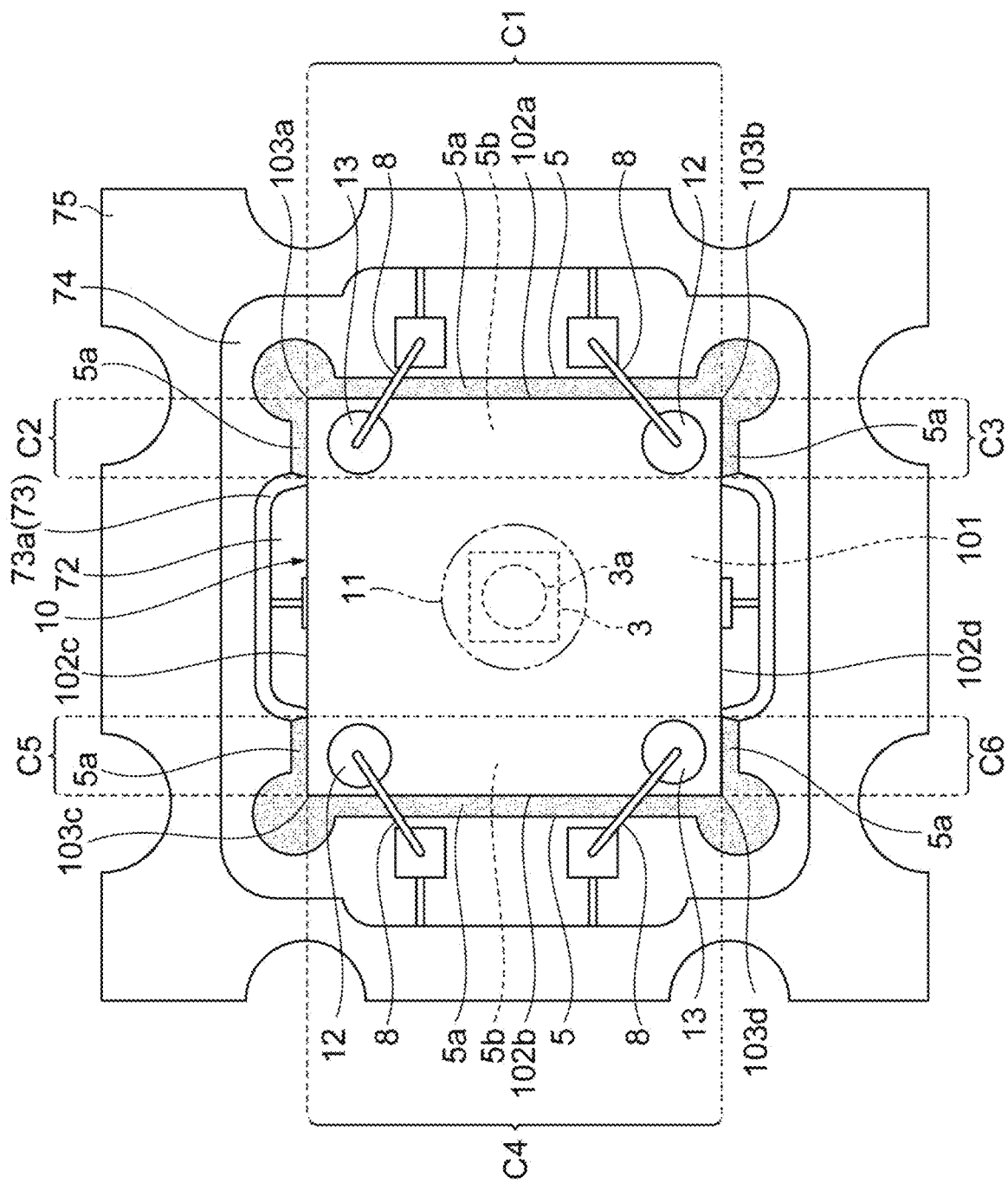
FIG. 6 is a plan view of a portion including a Fabry-Perot interference filter, a third layer substrate, and adhesive members in the light detection device of FIG. 5.

A configuration of the adhesive members 5 will be described in detail with reference to FIGS. 5 and 6. In FIG. 6, the sixth layer substrate 76 is omitted.

As illustrated in FIGS. 5 and 6, in a bottom surface 101 of the Fabry-Perot interference filter 10, a portion outside the light transmission region 11, which is a portion along a lateral surface 102 of the Fabry-Perot interference filter 10, is placed on a placement surface 73a of the third layer substrate 73. The Fabry-Perot interference filter 10 has the rectangular lateral surface 102 when viewed from the direction A. In the lateral surface 102, lateral surface (first or second lateral surface) 102a and lateral surface (first or third lateral surface) 102b face each other with the light transmission region 11 therebetween.

The lateral surface 102a is located on the placement surface 73a, such that a part of the placement surface 73a is disposed outside the lateral surface 102a (outside the lateral surface 102 when viewed from the direction A). As a result, a corner portion C1 is formed by the lateral surface 102a and a portion (exposed portion on which the Fabry-Perot interference filter 10 is not placed) outside the lateral surface 102a in the placement surface 73a. One end portion of the side of an angular portion 103a of the lateral surface (fifth lateral surface) 102c forming the angular portion 103a with the lateral surface (fourth lateral surface) 102a in the lateral surface 102 is located on the placement surface 73a, such that a part of the placement surface 73a is disposed outside the lateral surface 102c. As a result, a corner portion C2 is formed by one end portion of the lateral surface 102c and a portion (exposed portion on which the Fabry-Perot interference filter 10 is not placed) outside one end portion of the lateral surface 102c in the placement surface 73a. One end portion of the side of an angular portion 103b of the lateral surface (fifth lateral surface) 102d forming the angular portion 103b with the lateral surface (fourth lateral surface) 102a in the lateral surface 102 is located on the placement surface 73a, such that a part of the placement surface 73a is disposed outside the lateral surface 102d. As a result, a corner portion C3 is formed by one end portion of the lateral surface 102d and a portion (exposed portion on which the Fabry-Perot interference filter 10 is not placed) outside one end portion of the lateral surface 102d in the placement surface 73a. In addition, the lateral surface 102a, one end portion of the lateral surface 102c, and one end portion of the lateral surface 102d correspond to a part of an outer edge of the Fabry-Perot interference filter 10, when viewed from the direction A.

The lateral surface 102b is located on the placement surface 73a, such that a part of the placement surface 73a is disposed outside the lateral surface 102b. As a result, a corner portion C4 is formed by the lateral surface 102b and a portion (exposed portion on which the Fabry-Perot interference filter 10 is not placed) outside the lateral surface 102b in the placement surface 73a. The other end portion of the side of an angular portion 103c of the lateral surface (fifth lateral surface) 102c forming the angular portion 103c with the lateral surface (fourth lateral surface) 102b in the lateral surface 102 is located on the placement surface 73a, such that a part of the placement surface 73a is disposed outside the lateral surface 102c. As a result, a corner portion C5 is formed by the other end portion of the lateral surface 102c and a portion (exposed portion on which the Fabry-Perot interference filter 10 is not placed) outside the other end portion of the lateral surface 102c in the placement surface 73a. The other end portion of the side of an angular portion 103d of the lateral surface (fifth lateral surface) 102d forming the angular portion 103d with the lateral surface (fourth lateral surface) 102b in the lateral surface 102 is located on the placement surface 73a, such that a part of the placement surface 73a is disposed outside the lateral surface 102d. As a result, a corner portion C6 is formed by the other end portion of the lateral surface 102d and a portion (exposed portion on which the Fabry-Perot interference filter 10 is not placed) outside the other end portion of the lateral surface 102d in the placement surface 73a. In addition, the lateral surface 102b, the other end portion of the lateral surface 102c, and the other end portion of the lateral surface 102d correspond to a part of the outer edge of the Fabry-Perot interference filter 10, when viewed from the direction A.

The adhesive members 5 are disposed in the individual corner portions C1, C2, and C3. The adhesive members 5 disposed in the individual corner portions C1, C2, and C3 are continuous with each other. That is, the adhesive members 5 disposed in the individual corner portions C1, C2, and C3 are continuous over the entire corner portion C1 and cover the individual angular portions 103a and 103b from the outside. Likewise, the adhesive members 5 are disposed in the individual corner portions C4, C5, and C6. The adhesive members 5 disposed in the individual corner portions C4, C5, and C6 are continuous with each other. That is, the adhesive members 5 disposed in the individual corner portions C4, C5, and C6 are continuous over the entire corner portion C4 and cover the individual angular portions 103c and 103d from the outside.

The adhesive member 5 disposed in the individual corner portions C1, C2, and C3 includes a first portion 5a and a second portion 5b. The first portion 5a is a portion disposed along the individual corner portions C1, C2, and C3 and is continuous through the individual angular portions 103a and 103b. The second portion 5b is a portion disposed between the placement surface 73a of the third layer substrate 73 and the bottom surface 101 of the Fabry-Perot interference filter 10. In the corner portion C1, the first portion 5a contacts each of the lateral surface 102a, the placement surface 73a, and an inner surface 74a of the opening of the fourth layer substrate 74. In the corner portion C2, the first portion 5a contacts each of one end portion of the lateral surface 102c, the placement surface 73a, and the inner surface 74a of the opening of the fourth layer substrate 74. In the corner portion C3, the first portion 5a contacts each of one end portion of the lateral surface 102d, the placement surface 73a, and the inner surface 74a of the opening of the fourth layer substrate 74. That is, the adhesive member 5 disposed in the individual corner portions C1, C2, and C3 contacts each of the lateral surface 102, the placement surface 73a, and the inner surface 74a of the opening of the fourth layer substrate 74.

Likewise, the adhesive member 5 disposed in the individual corner portions C4, C5, and C6 includes a first portion 5a and a second portion 5b. The first portion 5a is a portion disposed along the individual corner portions C4, C5, and C6 and is continuous through the individual angular portions 103c and 103d. The second portion 5b is a portion disposed between the placement surface 73a of the third layer substrate 73 and the bottom surface 101 of the Fabry-Perot interference filter 10. In the corner portion C4, the first portion 5a contacts each of the lateral surface 102b, the placement surface 73a, and the inner surface 74a of the opening of the fourth layer substrate 74. In the corner portion C5, the first portion 5a contacts each of the other end portion of the lateral surface 102c, the placement surface 73a, and the inner surface 74a of the opening of the fourth layer substrate 74. In the corner portion C6, the first portion 5a contacts each of the other end portion of the lateral surface 102d, the placement surface 73a, and the inner surface 74a of the opening of the fourth layer substrate 74. That is, the adhesive member 5 disposed in the individual corner portions C4, C5, and C6 contacts each of the lateral surface 102, the placement surface 73a, and the inner surface 74a of the opening of the fourth layer substrate 74.

In the individual corner portions C1, C2, and C3, a highest edge portion 5c of the first portion 5a at the side of the lateral surface 102 reaches a lateral surface of a substrate 14 of the Fabry-Perot interference filter 10. That is, the adhesive member 5 disposed in the individual corner portions C1, C2, and C3 contacts the substrate 14 in the lateral surface 102. Likewise, in the individual corner portions C4, C5, and C6, a highest edge portion 5c of the first portion 5a at the side of the lateral surface 102 reaches the lateral surface of the substrate 14 of the Fabry-Perot interference filter 10. That is, the adhesive member 5 disposed in the individual corner portions C4, C5, and C6 contacts the substrate 14 in the lateral surface 102. In addition, a height of the edge portion 5c is smaller than heights of the Fabry-Perot interference filter 10 and the fourth layer substrate 74. In addition, a value (corresponding to the height of the edge portion 5c from the bottom surface 101 of the Fabry-Perot interference filter 10) obtained by subtracting the thickness of the second portion 5b in a direction vertical to the placement surface 73a in the adhesive member 5 from the height H of the first portion 5a in the direction vertical to the placement surface 73a is larger than the thickness of the second portion 5b in the direction vertical to the placement surface 73a.

[Function and Effect]

In the light detection device 1B, the adhesive members 5 having the elastic modulus smaller than the elastic modulus of the third layer substrate 73 are disposed in the corner portions C1, C2, C3, C4, C5, and C6 and contact each of the lateral surface 102 of the Fabry-Perot interference filter and the part of the placement surface 73a of the third layer substrate 73. As a result, stress generated in the Fabry-Perot interference filter 10 due to the difference of the thermal expansion coefficients between the Fabry-Perot interference filter 10 and other members (the first layer substrate 71, the second layer substrate 72, the fourth layer substrate 74, the fifth layer substrate 75, and the sixth layer substrate 76 as well as the third layer substrate 73) configuring the light detection device 1B can be sufficiently absorbed into the adhesive members 5, as compared with the case in which the adhesive members 5 are merely interposed between the bottom surface 101 of the Fabry-Perot interference filter 10 and the placement surface 73a of the third layer substrate 73, for example. In addition, the Fabry-Perot interference filter 10 can be held on the third layer substrate 73 more thinly in a stable state, as compared with the case in which the adhesive members 5 are merely interposed between the bottom surface 101 of the Fabry-Perot interference filter 10 and the placement surface 73a of the third layer substrate 73, for example. Therefore, according to the light detection device 1B, a temperature characteristic of the transmission wavelength in the Fabry-Perot interference filter 10 can be sufficiently improved and a holding state of the Fabry-Perot interference filter 10 on the third layer substrate 73 can be stabilized. In addition, the adhesive member 5 preferably has the elastic modulus smaller than the elastic modulus of other members (the Fabry-Perot interference filter 10, the first layer substrate 71, the second layer substrate 72, the fourth layer substrate 74, the fifth layer substrate 75, and the sixth layer substrate 76 as well as the third layer substrate 73) configuring the light detection device 1B.

In addition, the value obtained by subtracting the thickness of the second portion 5b in the direction vertical to the placement surface 73a in the adhesive member 5 from the height H of the first portion 5a in the direction vertical to the placement surface 73a is larger than the thickness of the second portion 5b in the direction vertical to the placement surface 73a. As a result, the stress generated in the Fabry-Perot interference filter 10 due to the difference of the thermal expansion coefficients between the Fabry-Perot interference filter 10 and other members configuring the light detection device 1B can be sufficiently absorbed into the adhesive members 5.

If a width W of the first portion 5a in the direction vertical to the lateral surface 102 of the Fabry-Perot interference filter 10 is larger than the height H of the first portion 5a in the direction vertical to the placement surface 73a of the third layer substrate 73, both improvement of the temperature characteristic of the transmission wavelength in the Fabry-Perot interference filter 10 and stabilization of the holding state of the Fabry-Perot interference filter 10 on the third layer substrate 73 can be realized more surely. Therefore, the adhesive member 5 preferably contacts a portion of the placement surface 73a protruding to the outside of the lateral surface 102, over the entire width thereof.

In addition, in the light detection device 1B, the adhesive members 5 disposed in the corner portions C1, C2, C3, C4, C5, and C6 contact the substrate 14 in the lateral surface 102 of the Fabry-Perot interference filter 10. As a result, the stress generated in the Fabry-Perot interference filter 10 due to the difference of the thermal expansion coefficients between the Fabry-Perot interference filter 10 and other members configuring the light detection device 1B can be sufficiently absorbed into the adhesive members 5. In addition, because the substrate 14 supporting the first mirror 31 and the second mirror 41 is externally held by the adhesive member 5, the holding state of the Fabry-Perot interference filter 10 can be further stabilized.

In addition, in the light detection device 1B, the adhesive member 5 is disposed in the corner portion C1 to be continuous over the entire corner portion C1 formed by the lateral surface 102a of the Fabry-Perot interference filter 10 and contacts the lateral surface 102a. Likewise, the adhesive member 5 is disposed in the corner portion C4 to be continuous over the entire corner portion C4 formed by the lateral surface 102b of the Fabry-Perot interference filter 10 and contacts the lateral surface 102b. As a result, the stress generated in the Fabry-Perot interference filter 10 due to the difference of the thermal expansion coefficients between the Fabry-Perot interference filter 10 and other members configuring the light detection device 1B can be uniformly absorbed into the adhesive members 5, as compared with the case in which the plurality of adhesive members 5 are intermittently disposed in the individual corner portions C1 and C4 or the case in which the adhesive member 5 is disposed in only one place in the parts of the individual corner portions C1 and C4, for example.

In addition, in the light detection device 1B, the adhesive member 5 is disposed in the corner portion C1 formed by the lateral surface 102a of the Fabry-Perot interference filter 10 and contacts the lateral surface 102a. Furthermore, the adhesive member 5 is disposed in the corner portion C4 formed by the lateral surface 102b of the Fabry-Perot interference filter 10 facing the lateral surface 102a with the light transmission region 11 therebetween and contacts the lateral surface 102b. As a result, the Fabry-Perot interference filter 10 can be held on the third layer substrate 73 in a more stable state.

In addition, in the light detection device 1B, the adhesive members 5 disposed in the individual corner portions C1, C2, and C3 are continuous with each other and cover the individual angular portions 103a and 103b of the Fabry-Perot interference filter 10 from the outside. Likewise, the adhesive members 5 disposed in the individual corner portions C4, C5, and C6 are continuous with each other and cover the individual angular portions 103c and 103d of the Fabry-Perot interference filter 10 from the outside. As a result, in the angular portions 103a, 103b, 103c, and 103d on which the stress generated in the Fabry-Perot interference filter 10 due to the difference of the thermal expansion coefficients between the Fabry-Perot interference filter 10 and other members configuring the light detection device 1B easily concentrates, the stress can be sufficiently absorbed into the adhesive member 5.

In addition, in the light detection device 1B, because the adhesive member 5 is not provided on the entire bottom surface 101 of the Fabry-Perot interference filter 10 (particularly, because the adhesive member 5 is not provided in the light transmission region 11), the following effects are obtained. That is, because the light transmitted through the Fabry-Perot interference filter 10 does not transmit the adhesive member 5, it becomes unnecessary to select the adhesive member 5 having high light transmittance and a degree of freedom in selecting the adhesive member 5 is improved. In addition, because the light transmitted through the Fabry-Perot interference filter 10 does not transmit the adhesive member 5, the light transmitting the Fabry-Perot interference filter 10 is not affected by the change in the optical characteristics (the refractive index and the transmittance) of the adhesive member 5 due to the change in the ambient temperature. In addition, the Fabry-Perot interference filter 10 is suppressed from being distorted or inclined due to the stress generated by the contraction of the adhesive member 5 at the time of curing and the expansion and contraction of the adhesive member 5 due to the change in the ambient temperature at the time of use.

In addition, in the light detection device 1B, horizontally long spaces (spaces where a width in a direction vertical to the direction A is larger than a width in a direction parallel to the direction A) are provided at both sides of the Fabry-Perot interference filter in the direction A. In addition, in the light detection device 1B, outer edges of the spaces provided at both sides of the Fabry-Perot interference filter in the direction A when viewed from the direction A are defined by an inner edge of the SMD package 7. In addition, in the light detection device 1B, the space provided at the light incidence side of the Fabry-Perot interference filter 10 is larger than the space provided at the light emission side of the Fabry-Perot interference filter 10 in the widths in the direction vertical to the direction A. Meanwhile, in the light detection device 1B, the space provided at the light emission side of the Fabry-Perot interference filter 10 is larger than the space provided at the light incidence side of the Fabry-Perot interference filter 10 in the widths in the direction parallel to the direction A. In addition, in the light detection device 1B, the Fabry-Perot interference filter 10 is electrically connected to the plurality of electrode pads 77 provided on the bottom surface of the SMD package 7 via wiring lines provided in the SMD package 7.

From the above, the light detection device 1B can be miniaturized. By providing the horizontally long spaces at both sides of the Fabry-Perot interference filter in the direction A, a distance between the opening 76c of the sixth layer substrate 76 and the Fabry-Perot interference filter 10 and a distance between the Fabry-Perot interference filter 10 and the light detector 3 can be decreased, as compared with the case in which vertically long spaces are provided. Therefore, even if light is incident from the opening 76c somewhat obliquely, the incidence light can be caused to transmit the light transmission region 11 of the Fabry-Perot interference filter 10 and the transmission light can be caused to be incident on the light reception unit 3a of the light detector 3. In addition, by providing the horizontally long spaces at both sides of the Fabry-Perot interference filter in the direction A, a volume of the SMD package 7 can be decreased by decreasing a height of a member configuring the SMD package 7, as compared with the case in which the vertically long spaces are provided. Therefore, the stress can be suppressed from being generated due to a difference of thermal expansion coefficients between the Fabry-Perot interference filter 10 and the SMD package 7.

The first and second embodiments of the present invention have been described. However, the present invention is not limited to the first and second embodiments. For example, in the first embodiment, the adhesive member 5 includes the second portion 5b disposed between the placement surface 4a of the spacer 4A and the bottom surface 101 of the Fabry-Perot interference filter 10. However, if the adhesive member 5 includes the first portion 5a, the adhesive member 5 may not include the second portion 5b. Likewise, in the second embodiment, the adhesive member 5 includes the second portion 5b disposed between the placement surface 73a of the third layer substrate 73 and the bottom surface 101 of the Fabry-Perot interference filter 10. However, if the adhesive member 5 includes the first portion 5a, the adhesive member 5 may not include the second portion 5b. If the adhesive member 5 includes the first portion 5a, the temperature characteristic of the transmission wavelength in the Fabry-Perot interference filter 10 can be sufficiently improved and the holding state of the Fabry-Perot interference filter 10 can be stabilized. In addition, a material and a shape of each configuration are not limited to the material and the shape described above and various materials and shapes can be adopted.

Figure 7:
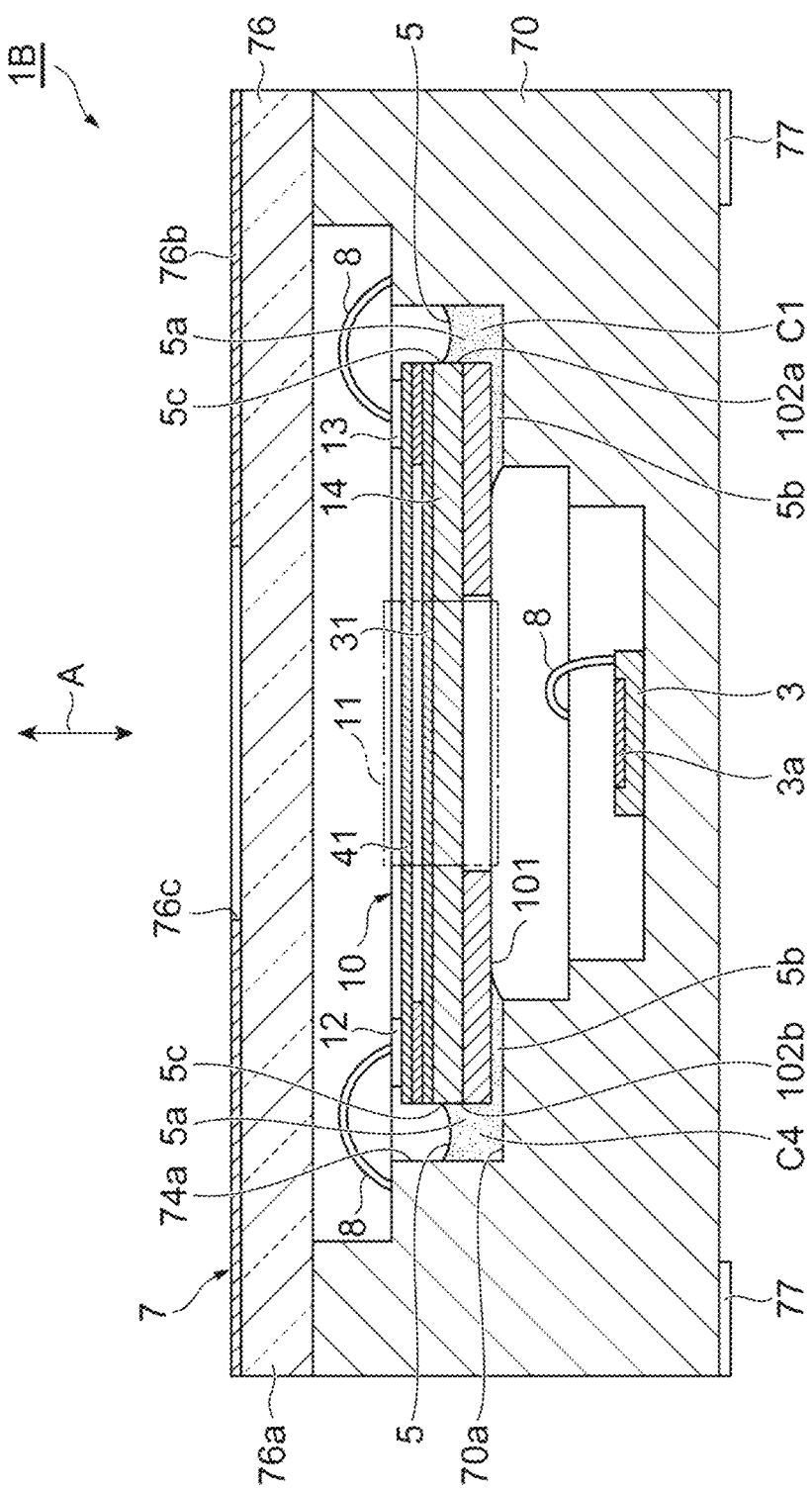
FIG. 7 is a cross-sectional view of a modification of the light detection device according to the second embodiment.

In addition, in the second embodiment, the first layer substrate 71, the second layer substrate 72, the third layer substrate 73, the fourth layer substrate 74, and the fifth layer substrate 75 are formed separately. However, as illustrated in FIG. 7, the bottom surface 101 of the Fabry-Perot interference filter 10 may be placed on a placement surface 70a of a support object (support object) 70 corresponding to an object obtained by integrally forming the substrates. In this case, a shape variation for every SMD package 7 formed is small as compared with the case where the first layer substrate 71, the second layer substrate 72, the third layer substrate 73, the fourth layer substrate 74, and the fifth layer substrate 75 are overlapped and adhered to each other. In addition, because the adhesive members to adhere the first layer substrate 71, the second layer substrate 72, the third layer substrate 73, the fourth layer substrate 74, the fifth layer substrate 75, and the sixth layer substrate 76 to each other are unnecessary, a change in the shape of the SMD package 7 caused by the expansion and contraction of the adhesive member due to the change in the ambient temperature is suppressed. In addition, because moisture included in external air can be prevented from intruding into the inside of the SMD package 7 through the adhesive member 5, the adhesive member 5 between the Fabry-Perot interference filter 10 and the SMD package 7 can be suppressed from being deteriorated due to an influence of the moisture. Therefore, in this case, the SMD package 7 with a more stable shape can be obtained.

In addition, in the first and second embodiments, the edge portion 5c of the adhesive member 5 reaches the lateral surface of the substrate 14 of the Fabry-Perot interference filter 10. However, the edge portion 5c of the adhesive member 5 does not reach the lateral surface of the substrate 14 and may reach the lateral surface of the laminate 50 of the Fabry-Perot interference filter 10. That is, the adhesive member 5 does not contact the lateral surface of the substrate 14 and may contact the lateral surface of the laminate 50.

INDUSTRIAL APPLICABILITY

According to the present invention, a light detection device capable of sufficiently improving a temperature characteristic of a transmission wavelength in a Fabry-Perot interference filter and stabilizing a holding state of the Fabry-Perot interference filter on a support member can be provided.

REFERENCE SIGNS LIST 1A, 1B: Optical detection device, 3: Light detector, 4, 4A, 4B: Spacer (support member), 4a: Placement surface, 5: Adhesive member, 5a: First portion, 5b: Second portion, 10: Fabry-Perot interference filter, 11: Light transmission region, 14: Substrate, 31: First mirror, 41: Second mirror, 70: Support object (support member), 70a: Placement surface, 73: Third layer substrate (support member), 73a: Placement surface, 101: Bottom surface, 102: Lateral surface, 102a: Lateral surface (first lateral surface, second lateral surface, fourth lateral surface), 102b: Lateral surface (first lateral surface, third lateral surface, fourth lateral surface), 102c, 102d: Lateral surface (fifth lateral surface), C1, C2, C3, C4, C5, C6: Corner portion.

The invention claimed is:
1. A light detection device comprising:
a Fabry-Perot interference filter that has a substrate, and a first mirror and a second mirror with variable distance therebetween, and is provided with a light transmission region to transmit light according to a distance between the first mirror and the second mirror;
a light detector that detects the light transmitted through the light transmission region;
a support member that has a placement surface on which a portion outside the light transmission region in a bottom surface of the Fabry-Perot interference filter is placed, the bottom surface being a surface facing away from the first mirror and the second mirror in the Fabry-Perot interference filter; and
an adhesive member that adheres the Fabry-Perot interference filter and the support member to each other,
wherein the adhesive member includes a first portion disposed out of a region between the placement surface and the bottom surface and a second portion disposed in the region between the placement surface and the bottom surface,
a height of the first portion in a direction vertical to the placement surface is larger than a height of the second portion in the direction vertical to the placement surface, and
the height of the first portion in the direction vertical to the placement surface is smaller than a width of the second portion in a direction vertical to a lateral surface of the Fabry-Perot interference filter,
wherein the Fabry-Perot interference filter and the support member are adhered to each other by the adhesive member directly below terminals of the Fabry-Perot interference filter.
2. The light detection device according to claim 1, wherein the first portion is disposed outside the second portion with respect to a center of the light transmission region when viewed from a direction in which the light transmits the light transmission region.
3. The light detection device according to claim 2, wherein the adhesive member further includes a third portion disposed inside the second portion with respect to the center of the light transmission region when viewed from the direction in which the light transmits the light transmission region.

4. The light detection device according to claim 3, wherein a width of the first portion is larger than a width of the third portion.

5. The light detection device according to claim 3, wherein the height of the first portion is larger than a height of the third portion.

6. The light detection device according to claim 1, wherein elastic modulus of the adhesive member is smaller than elastic modulus of the support member.

7. The light detection device according to claim 1, wherein the first portion does not reach a height of a surface of the substrate on a side that the first mirror and the second mirror are disposed.

8. The light detection device according to claim 1, wherein a surface of the first portion on a side opposite the placement surface is curved so as to be concave.

\* \* \* \* \*